May 12, 1959
K. C. BUGG
2,886,680
PRECISION POTENTIOMETER
Filed July 25, 1957
2 Sheets-Sheet 1
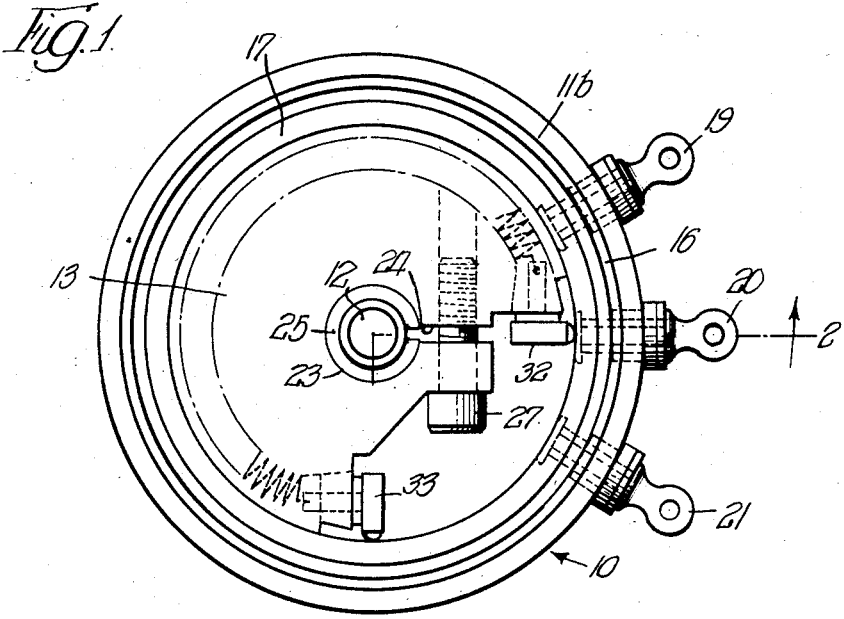
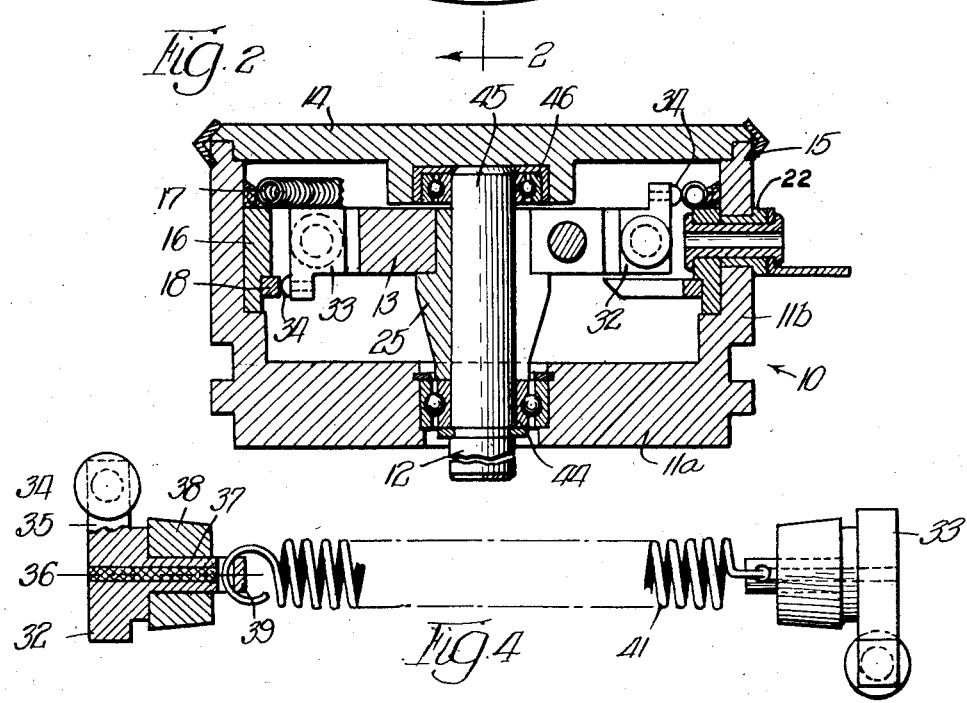
INVENTOR.
Kenly C. Bugg,
BY May 12, 1959  K. C. BUGG  2,886,680
PRECISION POTENTIOMETER
Filed July 25, 1957  2 Sheets-Sheet 2
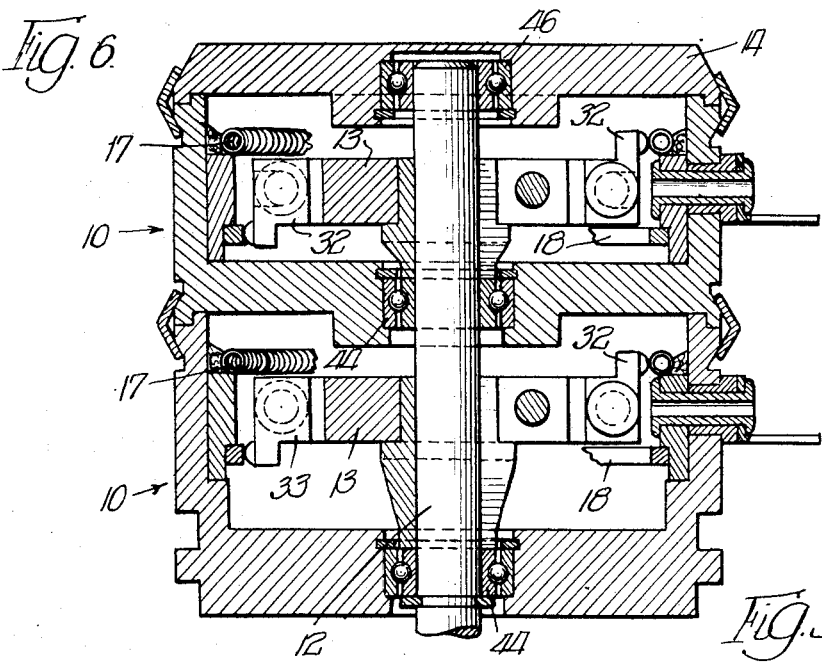
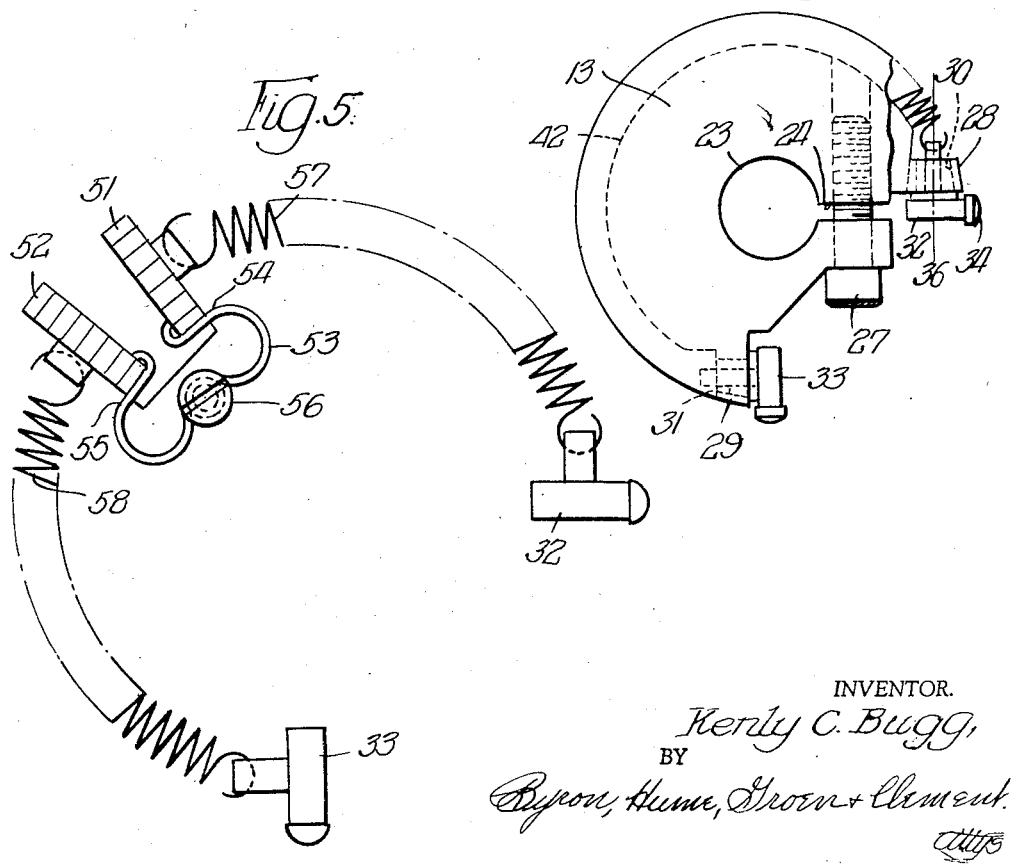
INVENTOR.
Kenly C. Bugg,
BY
Byron, Hume, Groen + Clement
Attys United States Patent Office 2,886,680
Patented May 12, 1959

2,886,680

PRECISION POTENTIOMETER

Kenly C. Bugg, Fort Wayne, Ind., assignor to Kendick Manufacturing Company, Inc., Fort Wayne, Ind., a corporation of Indiana Application July 25, 1957, Serial No. 674,145

16 Claims. (Cl. 201—48)

The present invention relates to potentiometers and particularly to an improved precision type potentiometer.

It is desired that a precision type potentiometer should have not only a high linearity characteristic and a low "noise" characteristic, but that it should be of a low resistance value, of simple, inexpensive and substantial construction, and should be relatively immune to shock. The linearity required in instruments of this character is limited, for example, to a variation of not more than .15% of the total resistance of the potentiometer. Such a standard is difficult to meet under any circumstance, but is much more difficult to meet in potentiometers having a relatively low total resistance such, for example, as 2,000 ohms. Potentiometers of such high linearity and low total resistance, may be used in ganged arrangements to achieve other higher total resistances having a total error well within the prescribed linearity limit.

"Noise" in a potentiometer is characterized as random fluctuations in resistance due to faulty construction, wear, coil corrosion, and the like, which causes variations in the contact resistance of the potentiometer. Naturally, noise in a potentiometer affects its linearity characteristic and the useful life of the potentiometer as a precision instrument. While it is not possible to eliminate all noise from a potentiometer, it is certainly desirable to provide a potentiometer construction in which the noise characteristic is reduced to an absolute minimum.

Good design in a precision potentiometer requires that a pressure of no more than five grams be exerted by the sliding contact on the resistance coil. This is a relatively light pressure and such a requirement proposes a considerable problem when coupled with a requirement that the sliding contact must also be resistant to displacement by shock. This latter requirement is particularly important in precision potentiometers utilized in aircraft, guided missiles, and the like where, obviously, the physical shocks which may be experienced in such environments are very large. Accordingly, it is particularly important that a precision potentiometer adaptable for many uses be designed so that the sliding contact exerts a substantially constant pressure of 5 grams against the resistance coils in both static and dynamic environments.

It is a general object of the present invention to provide an improved precision type potentiometer having a high linearity characteristic, a low noise characteristic, a relatively low resistance value, and being of substantial construction and design so as to have a long useful life and so as to be substantially immune to shock.

A more specific object of the invention is to provide an improved precision type potentiometer of a resistance in the order of 1,000 ohms and of a linearity in the order of .1% of the total resistance.

An additional object of the invention is to provide an improved precision type potentiometer for which the pressure between the sliding contact and the resistance coil is maintained substantially constant at approximately 5 grams irrespective of the physical environment in which the potentiometer is used and wherein the sliding contact is on a lever arm rotatably engaging the resistance coil under control of forces applied thereto by a torsional spring.

A further object of the invention is to provide an improved precision type potentiometer including a toroidal resistance element, a rotor for selecting the desired resistance, a slide ring providing a take off point for the selected resistance, a resistance contact mounted in the rotor and rotatably engaging the resistance coil, a slide ring contact also mounted in the rotor and rotatably engaging the slide ring, and an electrically conductive torsional spring arrangement connected in tension between the resistance contact and the slide ring contact for applying a predetermined rotational force to each of the contacts thereby to establish a constant pressure between the resistance contact and the resistance coil and between the ring contact and the slide ring, and for completing an electrical connection between the contacts.

The features of the invention pertain to the particular structure and arrangement of the precision type potentiometer in accordance with the invention whereby the above defined and additional objects are attained.

The invention, both as to its structure and mode of operation, will be better understood by the reference to the following specification and drawings, for forming a part thereof, wherein:

Figure 1 is a top plan view of a potentiometer assembly in accordance with the invention;

Figure 2 is an expanded sectional side view of the potentiometer assembly taken along line 2—2 of Figure 1;

Figure 3 is a plan view partially in section of the rotor and brush assembly of the potentiometer;

Figure 4 is an enlarged view of the spring and brush assembly shown in Figure 3;

Figure 5 is a substantially schematic representation of an alternative rotor and brush assembly for the potentiometer; and Figure 6 is an expanded sectional side view of the potentiometer assembly similar to that of Figure 2 showing two of potentiometers in accordance with the invention connected in ganged relationship.

Referring now to the drawings, Figure 1 is a top plan view of the potentiometer assembly with the top member thereof and the clamp ring for securing the top to the main potentiometer assembly removed. Figure 2 is a side view in section taken along lines 2—2 of Figure 1 of the potentiometer assembly including the top member thereof and the clamp ring for securing the top to the main potentiometer assembly. The potentiometer 10 shown in Figs. 1 and 2, includes a cylindrical casing 11 having a bottom wall 11a and a side wall 11b, a shaft 12 mounted in the bottom wall 11a for rotation in the axis of the cylindrical casing 11, a rotor 13 secured to the shaft 12 and rotable therewith, and a cover 14 fitted to the side walls 11b at the open end of the casing 11 and secured thereto by means of a clamp ring 15. A layer of insulating material 16 is positioned on the inner surface of the side wall 11b and carries thereon in spaced apart relationship a toroidal resistance coil 17 and a slip ring 18. The coil 17 may be sealed to the insulator 16 by means of an epoxy resin. Projecting through the side wall 11b of the cylindrical casing is a set of three terminals 19, 20, and 21. Each of the terminals is made of conductive material and is insulated from the sidewall 11b by an insulating material 22 as shown in Fig. 2. Two of the terminals, such as the terminals 19 and 20 are connected respectively to the ends of the toroidal resistance coil 17 and the other terminal 21 is connected to the slip ring 18.

The rotor 13 is a disc of substantially circular configuration having an aperture 23 in the center thereof and a slot 24 extending from the aperture to the outer periphery. The rotor 13 is fixed to the shaft 12 over an insulating bushing 25 and secured thereto by means of a clamping screw 27 extending through the slot 24. As best shown in Fig. 3, the rotor 13 includes two projections 28 and 29 positioned on its periphery in spaced apart relationship each of which is drilled in a direction substantially tangential to the periphery so that the projection 28 includes an aperture 30 therein and the projection 29 includes an aperture 31 therein. A brush assembly 32 is received within the aperture 30 of the projection 28 and a brush assembly 33 is received within the aperture 31 of the projection 29.

As shown in Figures 3 and 4, each of the brush assemblies 32 and 33 includes a contact surface 34 made of gold or of a compatible contact metal mounted on a lever arm 35 pivotable about an axis 36. Each brush assembly also includes a shaft portion 37 affixed to the lever arm 35 coaxial to the axis 36 and on which is mounted a bearing 38. The bearing 38 is dimensioned to fit within the aperture 30 of the projection 28 or the aperture 31 of the projection 29 and to make frictional engagement therewith so that the brush assembly is rotatable on its shaft 37 about an axis 36 at the periphery of the rotor 13. The bearing 38 and the rotor 13 are of electrical conductive material so as to complete a current path between brush assemblies 32 and 33. The free end 39 of the shaft 37 includes therein an aperture 40 for receiving one end of a helical spring 41 which is extended in tension between the two brush assemblies 32 positioned in the apertures of the projections 28 and 29. The spring 41 is positioned in tension around the periphery of the rotor 13 in a concave slot 42 located thereon. The slight tensive force exerted by the spring 41 causes the brush assemblies 32 to be firmly seated within the apertures 30 and 31 and the torsional forces exerted by the spring 41 tend to make the lever arms of the brush assemblies 32 and 33 rotate in opposite directions about their axes. The cooperative arrangement between the projection 28 and the brush assembly 32 is such that the contact surface 34 of the brush assembly is rotated in a plane radial to the center of the rotor 13 into an engagement normal with the toroidal coil 17. The cooperative arrangement between the projection 29 and the brush assembly 33 is such that the contact surface 34 thereof is rotated in a plane radial to the center of the rotor 13 into engagement normal with the slip ring 18.

The shaft 12 is mounted in the bottom wall 11a of the casing 10 by means of a bearing arrangement 44. The end 45 of the shaft 12 terminated within the casing 10 may also be supported in a bearing 46 located on the inner surface of the top member 14. This is but one of a number of bearing arrangements by which the shaft 12 may be supported in the casing.

The toroidal coil 17 may be wound of a fine gauge copper or aluminum wire in a manner as explained in the applicant's co-pending application Serial No. 513,110, filed June 3, 1955, entitled Method and Apparatus of Winding Coils. A coil wound according to the method described in the above-mentioned application has a linearity characteristic of plus or minus .15% of the total resistance even when the resistance of the coil is limited to the relatively low value of 2,000 ohms. A coil so wound is substantially "noiseless" in that it has a relatively even surface over which the sliding contact moves quite smoothly. The even surface is due to the fact that the adjacent turns in the coil are intimately contiguous thereby eliminating gaps between windings and permitting the sliding contact to easily and smoothly bridge the troughs between windings. Because the path of movement of the slide contact is smooth, wear on the slide contact and coil surface is minimized thereby contributing to the long life of the potentiometer assembly.

To provide satisfactory contact between the slide surfaces without causing undue wear, a pressure of approximately five grams should be applied. By employing a helical spring 41, or any other type of spring having a natural torsional mode of stress, between the brush assemblies 32 and 33, the contact surfaces 34 thereof can be caused to rotate into light engagement with the associated sliding surfaces. Preferably the spring 41 is of a helical configuration made of highly tensile material, such as beryllium copper alloy, and is formed of a multiplicity of turns. Such a spring when mounted in tension between the brush assemblies and in the slot 42 of the rotor will be substantially undisturbed by shocks. Additionally, because of the large number of turns in the spring over which the torsional forces are distributed, the pressure exerted on both brush assemblies is self-equalizing and is substantially unaffected by large radial movements of the brushes so that the brush pressure is maintained substantially constant at all times. The brush pressure may be adjusted merely by winding or unwinding the spring until the selected pressure is achieved.

Considering now the use of the potentiometer in accordance with the invention and assuming connection of the potentiometer in an electric circuit with a source of potential connected to the terminals 19 and 20, a linearly progressive voltage drop is experienced in the toroidal coil resistance 17 between the terminals 19 and 20. A circuit is completed from the resistance coil 17 at the contact surface 34 of the brush assembly 32, through the brush assembly 32, the rotor 13, the brush assembly 33, and the contact surface 34 thereof through the slide ring 18 connected to the terminal 21. Accordingly, the terminal 21 will be at a selected potential with regards to the terminal 19 and at a selected potential with regards to the terminal 20, the total of the two potentials being equal to the voltage drop through the resistance coil 17. The potential between the terminal 21 and either one of the terminals 19 and 20 may be varied by rotating the shaft 12 which causes the rotor 13 and the brush assemblies 32 and 33 to be rotated a corresponding amount. Upon rotation, the brush assembly 32 at its contact surface 34 makes successive contact with different points of linearly progressive potential on the resistance coil 17 which potentials, as previously explained, are transmitted to the terminal 21. Upon selection of the desired potential on the terminal 21, the shaft 12 may be locked into a fixed position by means not shown but considered to be well known in the art.

An alternative arrangement for the rotor and brush assembly is shown in Figure 5. Therein the rotor 13 has been modified to include means thereon for rotatably supporting circular ratchets 51 and 52. The ratchets are mounted to the rotor in substantially the same manner as the brush assemblies 32 and 33 by means of a bushing seated in an aperture located on the periphery of the rotor so that the ratchets are rotatable in planes radial to the center of the rotor 13. The ratchets 51 and 52 are locked against rotation by a spring 53 one end 54 of which forms a pawl for the ratchet 51 and the other end 55 of which forms a pawl for the ratchet 52. The spring 53 is secured to the rotor 13 by means of a screw 56. A helical spring 57 connects the ratchet 51 with the brush assembly 32 and a similar spring 58 connects the ratchet 52 to the brush assembly 33. The makeup of the springs 57 and 58 is substantially identical to the make up of the spring 41 described above. Also, the ratchets 51 and 52 and the spring 53 are made of conductive material so that a circuit is completed from the brush assembly 32 to the brush assembly 33 in the same manner as described above with regards to Figure 4. In this arrangement the pressure between the brush assembly 32 and the resistance coil 17 and the pressure between the brush assembly 33 and the slide ring 18 can be individually adjusted and need not be equal. Specifically, if it is desired to increase or decrease the rotational pressure of the brush assembly 32 the spring pawl 54 is released from the circular ratchet 51 and the ratchet is rotated in a direction to secure the desired pressure. In a similar fashion the pressure applied by the brush assembly 33 can be adjusted by releasing the spring pawl 55 and rotating the circular ratchet 52. The spring 53 should be relatively "stiff" to lock the ratchets 51 and 52 against rotation even in the environment of large shock forces.

In the variation of Figure 5 it is to be understood that the rotor 13, the springs 57 and 58, and the ratchet and pawl structure may all be made of conductive materials, as described with reference to the arrangement of Figures 1 to 4, or the rotor alone made of conductive material or all of the named items except the rotor made of conductive material, thereby to provide conductive paths between the brushes 32 and 33.

Another variation in the potentiometer assembly is shown in Figure 6, wherein two potentiometers each of a structure substantially as described and shown in Fig. 2 are connected in ganged relationship on the single shaft 12. Any number of additional potentiometers could be connected in this ganged relationship in the same manner. The terminals of the ganged potentiometers can be connected in any number of configurations to provide a total resistance greater than that which could be achieved from the use of one potentiometer and wherein the variations in the resistance is well within the linearity limitation stated.

In view of the foregoing, it is clear that there has been disclosed herein an improved precision type potentiometer of a substantially shock free structure, of a low resistance value and having a high linearity characteristic and being substantially devoid of noise impediments.

It is understood that while the embodiment disclosed herein is at present considered to be preferred, various modifications and improvements may be made therein and it is intended to cover in the appended claims all such modifications and improvements as fall within the true spirit and scope of the invention.

What is claimed is:

1. A potentiometer comprising a casing having a longitudinal axis, circular resistance means carried in said casing concentric with said axis, a slip ring carried in said casing concentric with said axis and spaced apart from said resistance means, a rotor coaxially mounted in said casing, a first brush member mounted on said rotor for rotation relative thereto in a plane substantially radial to said axis and for engaging said resistance means, a second brush member mounted on said rotor for rotation relative thereto in a plane substantially radial to said axis and for engaging said slip ring, and torsional spring means carried on said rotor between said first brush member and said second brush member for rotating said first brush member and said second brush member into contact respectively with said resistance means and with said slip ring.

2. A potentiometer comprising a casing having a longitudinal axis, circular resistance means carried in said casing concentric with said axis, a slip ring carried in said casing concentric with said axis and spaced apart from said resistance means, a rotor coaxially mounted in said casing, a first brush member mounted on said rotor for rotation relative thereto in a plane substantially radial to said axis and for engaging said resistance means, a second brush member mounted on said rotor for rotation relative thereto in a plane substantially radial to said axis and for engaging said slip ring, torsional spring means carried on said rotor in tension between said first brush member and said second brush member for rotating said first brush member and said second brush member into contact respectively with said resistance means and with said slip ring, and means for completing an electric conductive connection between said first brush member and said second brush member.

3. A potentiometer comprising a cylindrical casing having a longitudinal axis, resistance means carried in said casing concentric with said axis, a slip ring carried in said casing concentric with said axis and spaced apart from said resistance means, a rotor coaxially mounted in said casing, a first brush member mounted on said rotor for rotation relative thereto in a plane substantially radial to said axis and for engaging said resistance means, a second brush member mounted on said rotor for rotation relative thereto in a plane substantially radial to said axis and for engaging said slip ring, torsional spring means carried on said rotor in tension between said first brush member and said second brush member for rotating said first brush member and said second brush member into contact respectively with said resistance means and with said slip ring, said spring means being made of conductive material for completing an electric connection between said first brush member and said second brush member.

4. A potentiometer comprising a cylindrical casing having a longitudinal axis, resistance means carried interior to said casing and arranged concentric with said axis, a first terminal positioned exteriorly on said casing connected to one end of said resistance means, a second terminal positioned exteriorly on said casing connected to the other end of said resistance means, a slip ring carried interior to said casing and arranged concentric with said axis spaced apart from said resistance means, a third terminal positioned exteriorly on said casing connected to said slip ring, a shaft coaxially mounted in said casing for rotation and positioned mutually interior and exterior to said casing, a rotor fixed to said shaft interior to said casing, a first brush member mounted on said rotor for rotation relative thereto in a plane substantially radial to said axis and for engaging said resistance means, a second brush member mounted on said rotor for rotation relative thereto in a plane substantially radial to said axis and for engaging said slip ring, torsional spring means carried on said rotor in tension between said first brush member and said second brush member for rotating said first brush member and said second brush member into contact respectively with said resistance means and with said slip ring, said spring means being made of conductive material for completing an electric connection between said first brush member and said second brush member, whereby the resistance between said third terminal and one of said first and second terminals is a selective portion of the resistance between said first terminal and said second terminal.

5. A potentiometer comprising a cylindrical casing having a longitudinal axis, resistance means carried interior to said casing and arranged concentric with said axis, a first terminal positioned exteriorly on said casing connected to one end of said resistance means, a second terminal positioned exteriorly on said casing connected to the other end of said resistance means, a slip ring carried interior to said casing and arranged concentric with said axis spaced apart from said resistance means, a third terminal positioned exteriorly on said casing connected to said slip ring, a shaft coaxially mounted in said casing for rotation and positioned mutually interior and exterior to said casing, a rotor fixed to said shaft interior to said casing intermediate said resistance means and said slip ring, a first brush member received in said rotor for rotation relative thereto in a plane substantially radial to said axis and for engaging said resistance means, a second brush member received in said rotor in spaced relation from said first brush member for rotation relative to said rotor in a plane substantially radial to said axis and for engaging said slip ring, and torsional spring means carried on said rotor in tension between said first brush member and said second brush member for seating said first and second brush members in said rotor and for rotating said first and second brush members in opposite directions into contact respectively with said resistance means and with said slip ring, said spring means being made of conductive material for completing an electric connection between said first brush member and said second brush member, whereby the resistance between said third terminal and one of said first and second terminals is a selective portion of the resistance between said first terminal and said second terminal.

6. A potentiometer comprising a cylindrical casing having a longitudinal axis, resistance means carried interior to said casing and arranged concentric with said axis, a first terminal positioned exteriorly on said casing connected to one end of said resistance means, a second terminal positioned exteriorly on said casing connected to the other end of said resistance means, a slip ring carried interior to said casing and arranged concentric with said axis spaced apart from said resistance means, a third terminal positioned exteriorly on said casing connected to said slip ring, a shaft coaxially mounted in said casing for rotation and positioned mutually interior and exterior to said casing, a rotor fixed to said shaft interior to said casing intermediate said resistance means and said slip ring, a first aperture in said rotor arranged substantially tangential to the periphery thereof, a first brush member received in said first aperture for rotation in a plane substantially radial to said axis and for engaging said resistance means, a second aperture in said rotor arranged substantially tangential to the periphery thereof and spaced from said first aperture, a second brush member received in said second aperture for rotation in a plane substantially radial to said axis and for engaging said slip ring, and torsional spring means on the periphery of said rotor in tension between said first brush member and said second brush member for seating said first and second brush members in said apertures and for rotating said first and second brush members in opposite directions into contact respectively with said resistance means and with said slip ring, said torsional spring means being made of conductive material for completing an electric connection between said first brush member and said second brush member, whereby the resistance between said third terminal and one of said first and second terminals is a selective portion of the resistance between said first terminal and said second terminal.

7. The potentiometer set forth in claim 6 wherein said torsional spring means is a helical spring.

8. A potentiometer comprising a cylindrical casing having a longitudinal axis, resistance means carried interior to said casing and arranged concentric with said axis, a first terminal positioned exteriorly on said casing connected to one end of said resistance means, a second terminal positioned exteriorly on said casing connected to the other end of said resistance means, a slip ring carried interior to said casing and arranged concentric with said axis spaced apart from said resistance means, a third terminal positioned exteriorly on said casing connected to said slip ring, a shaft coaxially mounted in said casing for rotation and positioned mutually interior and exterior to said casing, a rotor fixed to said shaft interior to said casing intermediate said resistance means and said slip ring, a first aperture in said rotor arranged substantially tangential to the periphery thereof, a first brush member received in said first aperture for rotation in a plane substantially radially to said axis and for engaging said resistance means, a second aperture in said rotor arranged substantially tangential to the periphery thereof and spaced from said first aperture, a second brush member received in said second aperture for rotation in a plane substantially radial to said axis and for engaging said slip ring, and torsional spring means including a first helical spring and a first ratchet and a second helical spring and a second ratchet and a spring pawl common to said first and second ratchets, each of said first and second ratchets being mounted on said rotor for rotation in a plane radial to said axis, said first spring being in tension between said first brush member and said first ratchet for seating said brush member in said first aperture and for rotating said first brush member into contact with said resistance means, said second spring being in tension between said second brush member and said second ratchet for seating said brush member in said second aperture and rotating said second brush member into contact with said slip ring, said torsional spring means being made of conductive material for completing an electric connection between said first brush member and said second brush member, whereby the resistance between said third terminal and one of said first and second terminals is a selective portion of the resistance between said first terminal and said second terminal.

9. In a potentiometer assembly provided with an annular resistance element; the combination comprising a rotor mounted in said assembly coaxial with said resistance element, and a brush member carried on said rotor for slidably engaging said resistance element, said brush member being mounted to said rotor for rotation in a plane substantially normal to said resistance element.

10. In a potentiometer assembly provided with an annular resistance element; the combination comprising a rotor mounted in said assembly, and a brush member carried on said rotor for slidably engaging said resistance element, said brush member being mounted to said rotor for rotation in a plane substantially radial to the axis of said rotor.

11. In a potentiometer assembly provided with an annular resistance element; the combination comprising a rotor mounted in said assembly, a brush member carried on said rotor for slidably engaging said resistance element, said brush member being mounted to said rotor for rotation in a plane substantially radial to the axis of said rotor, and means on said rotor for forcibly rotating said brush member into engagement with said resistance member.

12. In a potentiometer assembly provided with an annular resistance element; the combination comprising a rotor mounted in said assembly, a brush member carried on said rotor for slidably engaging said resistance element, said brush member being mounted to said rotor for rotation in a plane substantially radial to the axis of said rotor, and adjustable means on said rotor for applying to said brush member a rotational force causing said brush member to engage said resistance element with a selected contact pressure.

13. In a potentiometer assembly, the combination set forth in claim 12, wherein said adjustable means includes a torsional spring connected to said brush member along its axis of rotation.

14. In a potentiometer assembly provided with an annular resistance element; the combination comprising a rotor mounted in said assembly, a brush member carried on said rotor for slidably engaging said resistance element, said brush member being mounted to said rotor for rotation in a plane substantially radial to the axis of said rotor, and adjustable means on said rotor for applying to said brush member a rotational force causing said brush member to engage said resistance element with a selected contact pressure; said adjustable means including a selectively rotatable terminus member mounted to said rotor spaced apart from said brush member and rotatable about an axis in curvilinear extension with the rotational axis of said brush member, and a helical spring made up of a multiplicity of windings connected in tension at one end to said terminus member along its axis of rotation and at the other end to said brush member along its axis of rotation for producing the rotational force between said rotor and said brush member.

15. In a potentiometer assembly provided with an annular resistance element; the combination comprising a rotor mounted in said assembly, a brush member carried on said rotor for slidably engaging said resistance element, said brush member being mounted to said rotor for rotation in a plane substantially radial to the axis of said rotor, and adjustable means on said rotor for applying to said brush member a rotational force causing said brush member to engage said resistance element with a selected contact pressure; said adjustable means including a ratchet mounted to said rotor spaced apart from said brush member and rotatable about an axis in curvilinear extension with the rotational axis of said brush member, a pawl fixed to said rotor and engaging said ratchet, and a helical spring made up of a multiplicity of windings connected in tension at one end to said ratchet along its axis of rotation and at the other end to said brush member along its axis of rotation for producing the rotational force between said rotor and said brush member.

16. A potentiometer comprising a cylindrical casing having a longitudinal axis, resistance means carried in said casing concentric with said axis, a slip ring carried in said casing concentric with said axis and spaced apart from said resistance means, a rotor coaxially mounted in said casing, a first brush member mounted on said rotor for rotation relative thereto in a plane substantially radial to said axis and for engaging said resistance means, a second brush member mounted on said rotor for rotation relative thereto in a plane substantially radial to said axis and for engaging said slip ring, and torsional spring means carried on said rotor in tension between said first brush member and said second brush member for rotating said first brush member and said second brush member into contact respectively with said resistance means and with said slip ring, said rotor being made of a conductive material for completing an electric conductive connection between said first brush member and said second brush member.

References Cited in the file of this patent

UNITED STATES PATENTS

| | | |
|---|---|---|
| 1,247,009 | Rhodus | Nov. 20, 1917 |
| 2,657,295 | Barclay | Oct. 27, 1953 |
| 2,675,451 | Tinus | Apr. 13, 1954 |
| 2,681,967 | Harrison et al. | June 22, 1954 |
| 2,690,488 | Parkinson et al. | Sept. 28, 1954 |